UNITED STATES PATENT OFFICE.

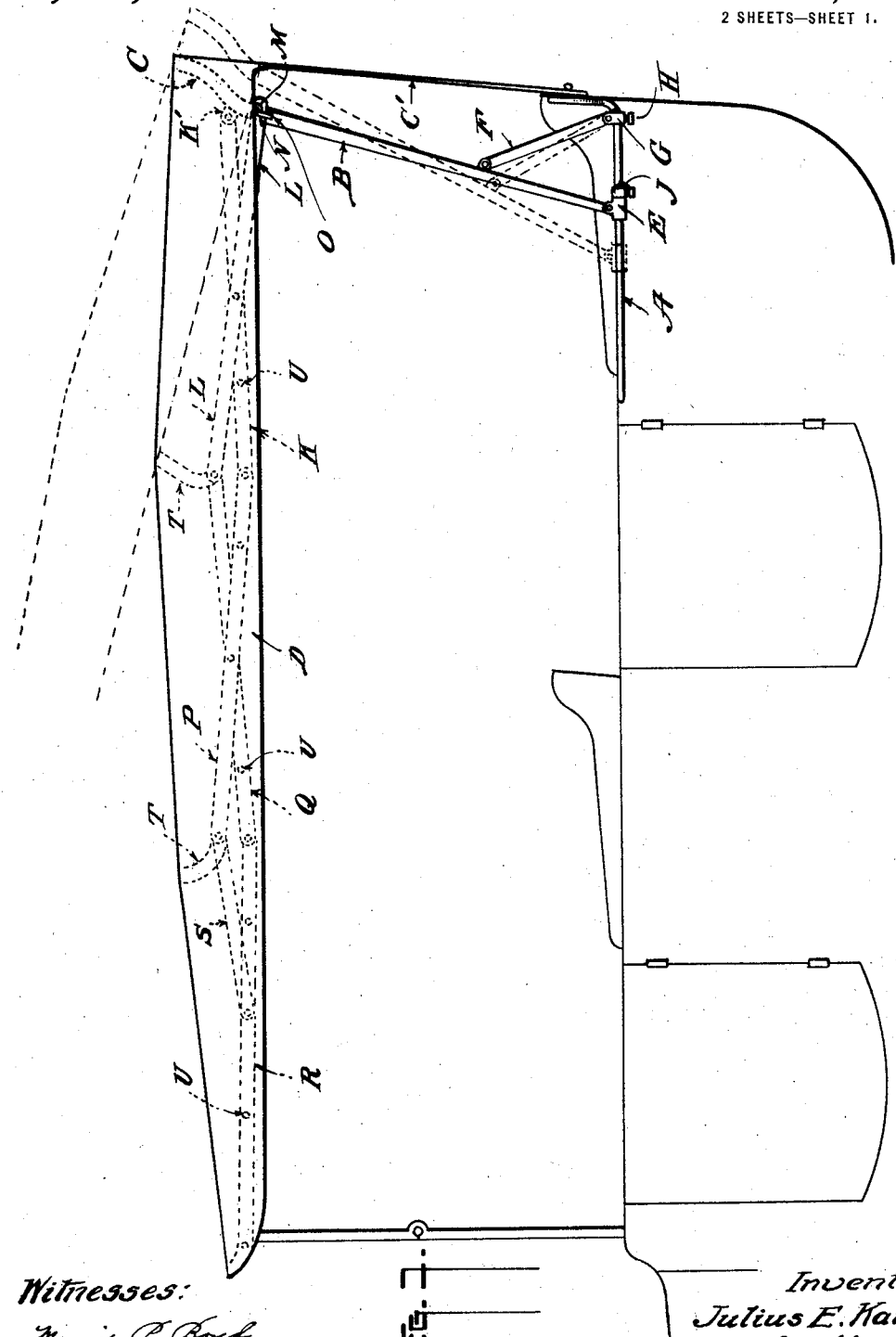

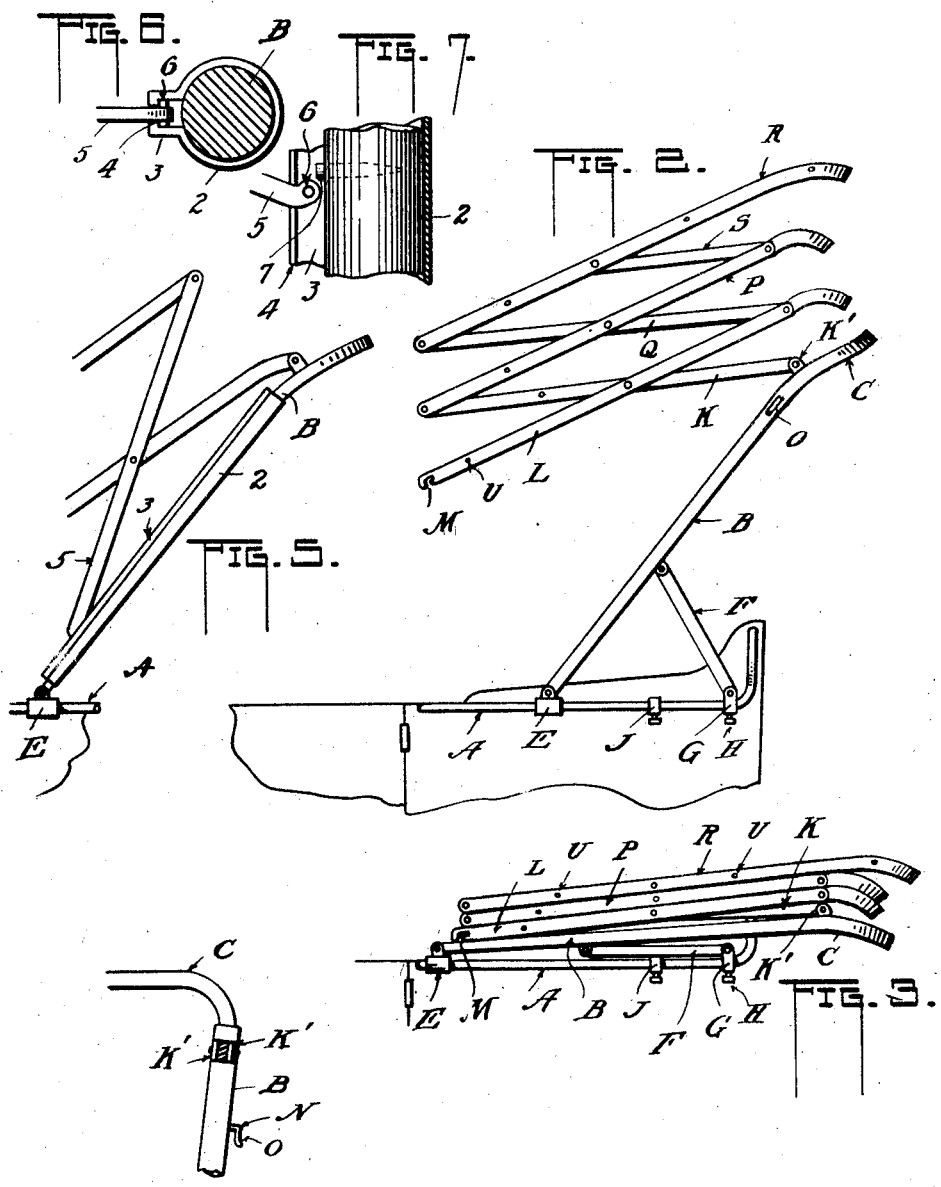

JULIUS E. KARL, OF PEORIA, ILLINOIS.

VEHICLE-TOP.

1,356,921.     Specification of Letters Patent.     Patented Oct. 26, 1920.

Application filed July 24, 1916. Serial No. 110,839.

*To all whom it may concern:*

Be it known that I, JULIUS E. KARL, citizen of the United States, residing at Peoria, in the county of Peoria and State of Illinois, have invented certain new and useful Improvements in Vehicle-Tops; and I do hereby declare that the following is a full, clear, and exact description of the invention, which will enable others skilled in the art to which it appertains to make and use the same.

This invention relates to improvements in vehicle tops. It relates more particularly to a new and novel form of folding top for a vehicle designed to support itself in its extended or raised position for use, being readily manipulated by one person.

The primary object of the invention is to furnish a top for vehicles devoid of bows or other supporting parts that would interfere with the clear view of persons seated in the vehicle.

Another object is to furnish a vehicle top with a folding frame-structure constituting a truss which when said top is raised or set up for use it will be supported in an absolutely firm and rigid manner.

Other objects and advantages will appear in the following specification aided by the accompanying drawings in which—

Figure 1 is an elevation of a vehicle body showing my improved top-supporting structure applied thereto.

Fig. 2 is an elevation of a portion of a vehicle body showing the manner of folding the parts involving my invention, the covering fabric not being shown.

Fig. 3 is a similar view showing the structure folded down in the position it is to occupy when not in use.

Fig. 4 is a detail of certain parts of the structure as viewed from the front.

Fig. 5 is an elevation of a portion of the structure of a slightly modified form.

Fig. 6 is a horizontal section of one of the parts of the top showing a member slidably related thereto; and, Fig. 7 is an elevation of the same showing one of the parts in section.

A represents a rail secured upon the side of the body of the vehicle at its rear, substantially in the position shown in Figs. 1, and 2 and having a horizontal portion to support the mechanism entering in the invention and now to be described.

B is a member commonly known as a socket, there being one at each side of the body, but one of which is shown, in which is secured a bow C that supports the usual covering fabric D.

E is a member or sleeve slidable upon the member A and having the said socket B pivotally attached to it. F is a link constituting a supporting bracket for the part B, one end having suitable loose connection with the latter and pivoted at its other end to a collar G adjustable upon the member A and secured by any suitable means such as a set screw H. J is a collar adjustable upon the member A and forming a limiting stop for the member E but the office of this will be described later herein.

K is a rod or bar preferably pivoted at one end to ears K' on the front side portion of the structure B C just described, see Fig. 4, and pivoted midway the length of said bar K is a similar bar L having at one end an angled notch M.

To the side of the member B is secured a stop N having a depending outwardly bent arm O, Fig. 4, whose purpose will appear presently.

Attached to the forward ends of the rods K L as seen in Fig. 1 are the ends of similar rods P Q respectively, the latter being crossed and pivotally connected at the middle of their lengths. To the free end of the member Q is pivoted one end of a bar R and connecting the end of the member P with said bar R is a link S substantially as shown, the whole structure thus described forming a "lazy-tongs" so constructed and arranged as to be readily folded after the manner shown in Figs. 2 and 3, and which is readily extensible to hold the top in its raised position as shown in said Fig. 1.

T T represent two bows secured at the points of connection of the bars L Q and P S, which are employed for supporting the top fabric D, and said bows may be fixed relatively to one of the members described or they may be pivotally related as may be the desire in practice.

As a matter of fact, it has been my practice to secure one of the bows relatively to one of the members and permit the other to have free pivotal movement as best answering the purpose of the invention in properly supporting the fabric and in permitting folding the structure in its position for non-use, however, this is mere choice.

In the raised extended position of the top the notched end of the member L engages the stop N, entering between the arm O and the member B, the weight of the top carrying the bottom of the notch rearwardly against said stop and thereby a positive lock for the structure is formed by which the latter is firmly supported.

It is thus seen that by connecting the various members of the lazy-tongs in the manner described the entire top will be a rigid structure throughout, it being designed that when the member L is locked at the stop N the lazy-tongs has been fully extended, the fabric at this time being smoothly stretched to present a proper orderly appearance.

In order to show the strength and rigidity of the structure I have indicated the member B in dotted lines moved forward at its lower end on the member A thereby moving its upper portion rearwardly due to the links F, raising the entire top at an angle. In practice the top because of its rigid structure throughout can be suspended without support at its forward end but in order to prevent its vibration when in use on the road it is preferably secured to the windshield or other portion of the vehicle by means of the usual straps or other means, not shown.

The link F described answers two purposes—that of supporting the member B rigidly in its raised position and supporting the whole top and for the purpose of stretching the back portion C' of the top. That is to say, when the top is extended and drawn down by means of straps or other devices referred to, but not shown, the said link F acts as a fulcrum since when the upper portion of the member B is drawn in a forward direction by pulling down the forward end of the top the lower end of the member B will tend to move rearwardly and thus raise that portion of the top lying above said link F and thereby stretch the said back C' tightly.

It is observed that aside from the members B which are so far in the rear as not to lie outside the line of vision of a person occupying the rear seat, there are no supporting members for the top lying forward of said member B so that a clear vision is provided, and no parts are in the way of the occupants of either seat of the car to interfere with their vision or their free movements in or about the vehicle. At the same time the truss formed by the lazy-tongs prevents any tendency to lateral strains or movements of the top, except as a whole, and all of the portions of the fabric are tightly stretched as already stated.

Besides the advantage of clear vision there is the ease of manipulation of said top in raising or lowering it. For instance, when it is desired to fold the top the attendant merely slightly raises the forward part and at the same time pushes it rearwardly in order to disengage the member L from the stop N after which the whole structure will collapse by the parts moving relatively to one another on their pivots and take up the reclining folded position. That is to say, that end of the member L, for instance, which has pivotal connection with the member Q swings in an arc described from the pivot point of the members K L and in the collapsible position lies adjacent to the point of connection of the member K with the bow C, which is also true of all of the other members, in that their positions are substantially reversed so that all may lie in a compact form as clearly shown in Fig. 3, wherein the member E has now been moved to substantially the forward limit of the member A, the link F having assumed a reclining position.

In Fig. 2 the structure apart from the member B is shown raised to an unnatural position merely for purposes of illustration, but in practice in folding the top down the members K P R lie substantially parallel to the member B and the latter necessarily assumes its reclining position as it falls, the link F causing the lower end of said member B to move forward on the rod A.

The collar J may be adjusted to a position along the member A where the parts of the structure will assume their proper positions relatively so that after having been located the parts will all assume the proper relation as the top is raised. The arm O of the stop N is preferably bent outward as illustrated in Fig. 4 so as to positively guide the member L into it as that member is raised in the act of extending the lazy-tongs.

As a very simple and convenient manner of attaching side curtains I provide a series of holes U in certain of the members as shown from which said curtains may be conveniently hung.

In Figs. 5, 6 and 7 I have illustrated a slightly modified form of certain of the parts. That is to say, a guide of suitable form is provided by attaching, for example, a suitable part to the member B. In the present case this consists of a portion 2 carried around said member B its resulting edges forming two forwardly extending parts 3, Fig. 6, each including an angled bend 4, each extending toward the other and leaving a space between them within which lies the end of the member 5, corresponding to L in the other figures, said end having a cross pin 6, for example, extending through it to engage the said angled bends 4. By this structure the member 5 is associated at all times with the guide thus provided and can readily move up and down therein as the structure is folded and unfolded.

A suitable stop such as a pin 7 is provided within the slide (see Fig. 7) to limit the upward movement of the member 5 and this forms a support in the same manner as that provided by the stop N of the other form described.

Now, since the entire upper structure forms a truss throughout to constitute a rigid top, due to the relation of the member L or 5 with the other members, the link F and the member B must act to sustain the entire top as though made of a single part.

My invention may be adapted to any make of car of any length including those having single seats.

The member A may be disposed in any desired position on the body and may be mounted farther toward the rear than that shown so that the member B may be carried farther in that direction but this is all within the meaning of the invention.

The whole object of my invention is to provide a vehicle top wholly free of any supports that will be in the way of the occupants of the car, or that will lie in the line of vision. The structure provided fully answers the requirements and a very firm job results from the construction employed.

I am aware that it is not new, of course, to provide a fabric carrying part rigid throughout and rigid with respect to an upright support. Neither is it new to hold an upwardly and forwardly extending top bow rigid with respect to the body whereby but a comparatively small portion of the length of the body is covered by a fabric carrying part attached to said bow.

As distinguished from these the support B of my device is held rigidly with respect to the body with its upper end at the extreme rear thereof, the fabric portion extending the full length of said body therefrom. In other words, it includes a bow or support so disposed at its lower end that it can be supported by a member such as F, thence extending upwardly and rearwardly to the extreme rearward out of the line of vision of the occupant of the seat and yet able to support the top of the full length of the body, all being capable of collapsing however.

Other minor changes may be resorted to without changing the principle of the invention since it is not my wish to be limited to the exact structure shown and described.

Having thus described my invention, I claim:—

1. In combination with a vehicle body, a substantially upright support slidably mounted at its lower end at the rear end of said body, a collapsible fabric supporting structure secured to its upper end including means to hold it rigid throughout its length when extended and likewise to hold it rigid with respect to the support, a member pivoted at one end to the support, and an adjustable part carried on the body to which its other end is pivotally attached.

2. In combination with a vehicle body, a substantially upright support slidably mounted at its lower end at the rear end of said body, a collapsible fabric supporting structure secured to its upper end including means to hold it rigid throughout its length when extended and likewise to hold it rigid with respect to the support, a member pivoted at one end to the support, its other end having a pivoting point fixed relatively to the body, and an adjustable part adapted to limit the sliding movement of the support in one direction.

3. In combination, a vehicle top structure including a series of collapsible members pivotally connected, a supporting member to which one of the members at one end of the structure is pivotally attached, one of the other of said members at said end having a free end, a stop on said supporting member adapted to receive and hold said free end whereby to maintain the structure in its extended position, a stationary member with which the supporting member is slidably related, an adjustable part on said stationary member to receive against it the supporting member, a second part on said stationary member, and a link pivotally connected between the last named part and said supporting member.

4. In combination, a vehicle top structure including a series of collapsible members pivotally connected, a supporting member to which one of the members at one end of the structure is pivotally attached, one of the other of said members at said end having a free end, a stop on said supporting member adapted to receive and hold said free end whereby to maintain the structure in its extended position, a stationary member with which the supporting member is slidably related, an adjustable part on said stationary member to receive against it the supporting member, a second adjustable part on said stationary member, and a link pivotally connected between the last named part and said supporting member.

In testimony whereof I affix my signature, in presence of two witnesses.

JULIUS E. KARL.

Witnesses:
 IRWIN L. FULLER,
 L. M. THURLOW.